United States Patent
Lim et al.

(10) Patent No.: US 9,182,302 B2
(45) Date of Patent: Nov. 10, 2015

(54) APPARATUS AND METHOD FOR MEASURING TACTILE SENSATION

(71) Applicant: Samsung Electronics Co., Ltd., Suwon-si (KR)

(72) Inventors: Soo Chul Lim, Seoul (KR); Joon Ah Park, Hwaseong-si (KR); Jong Jin Park, Hwaseong-si (KR); Bho Ram Lee, Seongnam-si (KR); Hyun Jeong Lee, Hwaseong-si (KR); Seung Ju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 13/741,837

(22) Filed: Jan. 15, 2013

(65) Prior Publication Data

US 2014/0007700 A1 Jan. 9, 2014

(30) Foreign Application Priority Data

Jul. 6, 2012 (KR) ........................ 10-2012-0073991

(51) Int. Cl.
*G01L 1/04* (2006.01)
*G01L 1/22* (2006.01)
*G01L 1/18* (2006.01)
*G06F 17/00* (2006.01)
*G01L 5/16* (2006.01)
*G01L 1/20* (2006.01)

(52) U.S. Cl.
CPC . *G01L 1/18* (2013.01); *G06F 17/00* (2013.01); *G01L 1/205* (2013.01); *G01L 5/161* (2013.01); *G01L 5/162* (2013.01); *Y10T 29/49103* (2015.01)

(58) Field of Classification Search
CPC ........... G01L 1/18; G01L 1/205; G01L 5/161; G01L 5/162
USPC .................... 73/862.041–862.046, 73/862.625–862.627, 818
See application file for complete search history.

(56) References Cited

U.S. PATENT DOCUMENTS

| | | | | |
|---|---|---|---|---|
| 4,745,812 | A * | 5/1988 | Amazeen et al. | 73/862.041 |
| 5,010,773 | A | 4/1991 | Lorenz et al. | |
| 5,311,779 | A * | 5/1994 | Teruo | 73/726 |
| 7,594,442 | B2 * | 9/2009 | Kaiserman et al. | 73/763 |
| 7,669,480 | B2 * | 3/2010 | Maekawa | 73/777 |
| 7,703,333 | B2 * | 4/2010 | Hayakawa et al. | 73/849 |
| 8,661,917 | B2 * | 3/2014 | Jheng et al. | 73/862.68 |
| 8,820,173 | B2 * | 9/2014 | Clark et al. | 73/768 |

(Continued)

FOREIGN PATENT DOCUMENTS

| | | |
|---|---|---|
| JP | 07-055611 | 3/1995 |
| JP | 2006-064465 | 3/2006 |

(Continued)

*Primary Examiner* — Lisa Caputo
*Assistant Examiner* — Jonathan Dunlap
(74) *Attorney, Agent, or Firm* — NSIP Law

(57) ABSTRACT

An apparatus and method for measuring a tactile sensation is provided. The tactile sensation measuring apparatus may include a plurality of pressure measuring units, each to measure a magnitude of an external pressure applied, using a variable resistance material of which a resistance changes when an external pressure is applied, and a tactile sensation measuring unit to measure a three-dimensional (3D) tactile sensation corresponding to the external pressure, based on a position of each of the plurality of pressure measuring units, and the magnitude of the external pressure measured by each of the plurality of pressure measuring units.

14 Claims, 13 Drawing Sheets

(56) References Cited

U.S. PATENT DOCUMENTS

2009/0044639 A1    2/2009   Maekawa
2011/0193363 A1    8/2011   Nishiwaki
2012/0017703 A1*   1/2012   Ikebe et al. .............. 73/862.626

FOREIGN PATENT DOCUMENTS

| | | |
|---|---|---|
| JP | 2009-294140 | 12/2009 |
| JP | 2011-163945 | 8/2011 |
| KR | 10-2005-0112917 | 12/2005 |

* cited by examiner

APPARATUS AND METHOD FOR MEASURING TACTILE SENSATION

CROSS-REFERENCE TO RELATED APPLICATIONS

This application claims the priority benefit of Korean Patent Application No. 10-2012-0073991, filed on Jul. 6, 2012, in the Korean Intellectual Property Office, the disclosure of which is incorporated herein by reference.

BACKGROUND

1. Field

Embodiments relate to an apparatus and method for measuring a tactile sensation, and more particularly, to an apparatus and method that may measure a tactile sensation using a material of which a resistance changes when a pressure is applied.

2. Description of the Related Art

A technology for measuring a tactile sensation may refer to a technology for measuring physical properties of a target object or surroundings in a contact-type manner, and may be required for stability of a robot or a human, and high-performance and intelligence of the robot.

In order to use a tactile sensor for a medical robot in the technology for measuring the tactile sensation, damage to an organ in contact with the tactile sensor is to be minimized. Accordingly, a surface of the tactile sensor may be formed of a smooth, flexible material to have flexibility similar to human skin. The tactile sensor may need to be able to measure a shear force and a normal force, similar to a user.

SUMMARY

In an aspect of one or more embodiments, there is provided an apparatus for measuring a pressure, the apparatus including a resistance measuring unit to measure a resistance of a variable resistance material of which a resistance changes when an external pressure is applied, and a pressure determining unit to determine a magnitude of the external pressure applied to the variable resistance material, based on the measured resistance.

The pressure determining unit may determine the magnitude of the external pressure applied to the variable resistance material to be proportional to the measured resistance.

The variable resistance material may include a first conductor of which a volume is reduced by an external pressure applied, and a second conductor of which a volume is maintained irrespective of an external pressure applied, and the second conductor may have a resistance higher than a resistance of the first conductor.

The pressure determining unit may determine the magnitude of the external pressure applied to the variable resistance material to be inversely proportional to the measured resistance.

The variable resistance material may include a first conductor of which a volume is reduced by an external pressure applied, and a second conductor of which a volume is maintained irrespective of an external pressure applied, and the second conductor may have a resistance lower than a resistance of the first conductor.

In an aspect of one or more embodiments, there is provided an apparatus for measuring a tactile sensation, the apparatus including a plurality of pressure measuring units, each to measure a magnitude of an external pressure, using a variable resistance material of which a resistance changes when an external pressure is applied, and a tactile sensation measuring unit to measure a three-dimensional (3D) tactile sensation corresponding to the external pressure, based on a position of each of the plurality of pressure measuring units, and the magnitude of the external pressure measured by each of the plurality of pressure measuring units.

The apparatus may further include a pressure providing unit to provide a pressure to at least one of the plurality of pressure measuring units, in a direction in which the pressure is applied based on a motion of a user.

In an aspect of one or more embodiments, there is provided a method of measuring a pressure, the method including measuring a resistance of a variable resistance material of which a resistance changes when an external pressure is applied, and determining magnitude of an external pressure applied to the variable resistance material, based on the measured resistance.

In an aspect of one or more embodiments, there is provided a method of measuring a tactile sensation, the method including measuring, by each of a plurality of pressure measuring units, a magnitude of an external pressure, using a variable resistance material of which a resistance changes when an external pressure is applied, and measuring a 3D tactile sensation corresponding to the external pressure, based on a position of each of the plurality of pressure measuring units, and the magnitude of the external pressure measured by each of the plurality of pressure measuring units.

In an aspect of one or more embodiments, there is provided a method of manufacturing a tactile sensation measuring apparatus, the method including disposing a plurality of electrodes, and a plurality of wires on a substrate, connecting, to the plurality of electrodes, a variable resistance material of which a resistance changes when an external pressure is applied, generating a sensing layer to provide a pressure to the variable resistance material in response to a motion of a user, and connecting the sensing layer to the substrate.

The connecting of the variable resistance material may include connecting the variable resistance material to an electrode disposed to be vertical to the substrate, and an electrode disposed to be horizontal to the substrate.

In an aspect of one or more embodiments, there is provided at least one non-transitory computer readable medium storing computer readable instructions to implement methods of embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
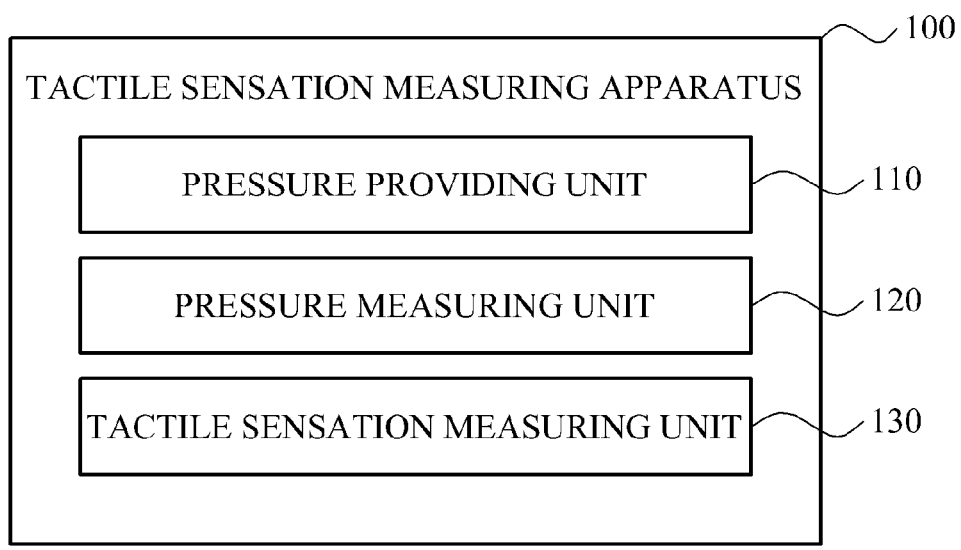
FIG. 1 is a block diagram illustrating an apparatus for measuring a tactile sensation according to embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a block diagram illustrating an apparatus for measuring a tactile sensation according to embodiments.

Referring to FIG. 1, a tactile sensation measuring apparatus 100 may include a pressure providing unit 110, a plurality of pressure measuring units 120, and a tactile sensation measuring unit 130. In this instance, the tactile sensation measuring apparatus 100 may correspond to a tactile sensor.

The pressure providing unit 110 may provide an external pressure to at least one of the plurality of pressure measuring units 120 in a direction in which the external pressure is applied based on a motion of a user.

In this instance, the pressure providing unit 110 may be formed of a flexible polymer having elasticity greater than a predetermined level. For example, the pressure providing unit 110 may be formed of a polymer having elasticity similar to elasticity of rubber. In addition, the pressure providing unit 110 may include at least one projection on a surface to be in contact with the user.

A process of the pressure providing unit 110 providing the external pressure to at least one of the plurality of pressure measuring units 120 will be described in detail with reference to FIGS. 5 and 6.

Each of the plurality of pressure measuring units 120 may measure a magnitude of the external pressure, using a variable resistance material of which a resistance changes when the external pressure is applied. Depending on embodiments, the variable resistance material may indicate a resistance proportional to the external pressure, or a resistance inverse proportional to the external pressure.

Structures of the variable resistance material will be described in detail with reference to FIGS. 7 and 8.

Accordingly, each of the plurality of pressure measuring units 120 may measure an increase or a decrease in the magnitude of the external pressure applied to the variable resistance material, depending on compositions and a resistance of the variable resistance material.

In addition, the plurality of pressure measuring units 120 may be disposed in a form of an array in a lower portion of the pressing providing unit 110.

A detailed configuration of each of the plurality of pressure measuring unit 120 will be described in detail with reference to FIG. 2.

The tactile sensation measuring unit 130 may measure a three-dimensional (3D) tactile sensation corresponding to the external pressure, based on a position of each of the plurality of pressure measuring units 120, and the magnitude of the external pressure measured by each of the plurality of pressure measuring units 120.

For example, when the plurality of pressure measuring units 120 measures an identical pressure, the tactile sensation measuring unit 130 may measure an external pressure applied by the user in a direction vertical to the pressure providing unit 110. In addition, when a portion of the plurality of pressure measuring units 120 measures a higher pressure when compared to another portion of the plurality of pressure measuring units 120, the tactile sensation measuring unit 130 may measure an external pressure applied by the user to a location adjacent to the portion of the plurality of pressure measuring units 120, or an external pressure applied by the user in a direction of the portion of the plurality of pressure measuring units 120.

Figure 2:
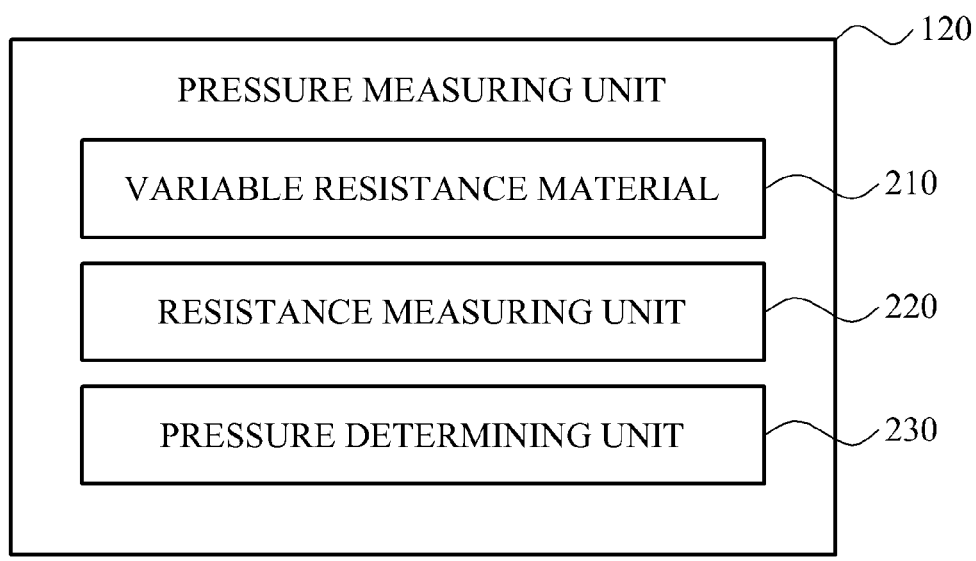
FIG. 2 is a block diagram illustrating a pressure measuring unit according to embodiments.

FIG. 2 is a block diagram illustrating a pressure measuring unit according to embodiments.

Referring to FIG. 2, a pressure measuring unit 120 may include a variable resistance material 210, a resistance measuring unit 220, and a pressure determining unit 230.

The variable resistance material 210 may correspond to a material of which a resistance changes when an external pressure is applied. In particular, the variable resistance material 210 may include a first conductor of which a volume is reduced by an external pressure applied, and a second conductor of which a volume is maintained irrespective of an external pressure applied. In this instance, the resistance of the variable resistance material 210 may be determined based on a distance through which electricity passes in the first conductor and the second conductor, a resistance of the first conductor, and a resistance of the second conductor.

In this instance, when the resistance of the second conductor is higher than the resistance of the first conductor, the variable resistance material 210 may indicate a resistance proportional to the external pressure. In particular, when the external pressure is applied, the volume of the first conductor in the variable resistance material 210 may be reduced. That is, a time or a distance through which the electricity input into the variable resistance material 210 passes in the first conductor may decrease. Accordingly, a proportion of a distance through which the electricity passes in the second conductive having a higher resistance to a distance through which the electricity passes in the variable resistance material 210 may increase.

For example, in the case of a distance the electricity being input into the variable resistance material 210 passing through the variable resistance material 210 corresponding to 100, a distance through which the electricity passes in the first conductor corresponds to 50, a resistance of the first conductor corresponds to 20, and a resistance of the second conductor corresponds to 40, a resistance of the variable resistance material 210 may be calculated by 20×0.5+40×0.5=30. In addition, in a case in which the distance the electricity input into the variable resistance material 210 passes through the variable resistance material 210 corresponds to 100, and the distance through which the electricity passes in the first conductor is reduced to 25, the resistance of the variable resistance material 210 may be increased to 20×0.25+40×0.75=35. Accordingly, when the volume of the first conductor is reduced by the external pressure applied, the resistance of the variable resistance material 210 may increase.

In addition, when the resistance of the second conductor is lower than the resistance of the first conductor, the variable resistance material 210 may indicate a resistance inversely proportional to the external pressure applied. In this instance, the second conductor may be formed of graphene.

In this instance, when the external pressure is applied, the distance through which the electricity passes in the first conductor having a higher resistance may decrease. Accordingly, when the electricity passes through the variable resistance material 210, a probability of the electricity passing through the second conductor having a lower resistance may increase. Accordingly, when the volume of the first conductor is reduced by the external pressure applied, the resistance of the variable resistance material 210 may decrease.

The variable resistance material 210 may include at least one of a material formed by arranging plate-shaped graphene in an identical direction, a material such as a graphene flower in which plate-shaped graphene is formed in various directions, and a material formed by arranging carbon nanotubes (CNTs) in a single direction.

The resistance measuring unit 220 may measure the resistance of the variable resistance material 210. In this instance, the resistance measuring unit 220 may input electricity into one side of the variable resistance material 210, and may measure a voltage or a current of the electricity passing through the variable resistance material 210 at another side of the variable resistance material 210, thereby measuring the resistance of the variable resistance material 210.

The pressure determining unit 230 may determine a magnitude of the external pressure applied to the variable resistance material 210, based on the resistance measured by the resistance measuring unit 220. In this instance, the pressure determining unit 230 may determine a magnitude of the external pressure corresponding to the resistance, depending on properties of the variable resistance material 210.

For example, when the resistance of the variable resistance material 210 changes in proportion to the external pressure, the pressure determining unit 230 may determine the magnitude of the external pressure applied to the variable resistance material 210 to be proportional to the resistance measured by the resistance measuring unit 220. In addition, when the resistance of the variable resistance material 210 changes in inverse proportion to the external pressure, the pressure determining unit 230 may determine the magnitude of the external pressure applied to the variable resistance material 210 to be inversely proportional to the resistance measured by the resistance measuring unit 220.

Figure 3:
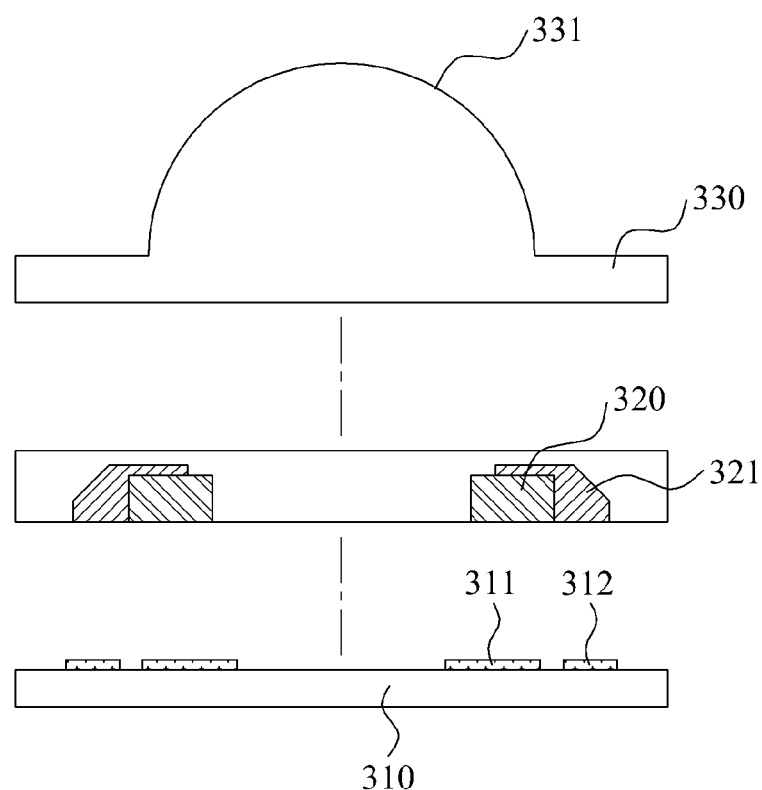
FIG. 3 is an exploded cross-sectional view illustrating a tactile sensation measuring apparatus according to embodiments.

FIG. 3 is an exploded cross-sectional view illustrating a tactile sensation measuring apparatus according to embodiments.

As shown in FIG. 3, the tactile sensation measuring apparatus 100 may include a lower plate 310, a variable resistance material 320 connected to the lower plate 310, and an upper plate 330. In this instance, the lower plate 310 and the upper plate 330 may be formed of polydimethylsiloxane (PDMS).

The lower plate 310 may operate as the tactile sensation measuring unit 130. For example, metallic wires connecting the tactile sensation measuring unit 130 to the lower plate 310, an electrode 311 that supplies electricity to the variable resistance material 320, and an electrode 312 that outputs the electricity may be disposed on the lower plate 310.

In this instance, the variable resistance material 320 may be compressed by an external pressure applied to the upper plate 330. When the electrode 311 and the electrode 312 are disposed on a left side and a right side of the variable resistance material 320, respectively, transfer of the external pressure may be interrupted due to heights of the electrode 311 and the electrode 312. In addition, when both the electrode 311 and the electrode 312 are connected to a lower portion of the variable resistance material 320, the electricity may pass through only the lower portion of the variable resistance material 320.

Accordingly, when an electricity transfer unit 321, which has a relatively low resistance and transfers to the electrode 312, the electricity output from the variable resistance material 320, is connected to a side surface of the variable resistance material 320, the electricity input into the electrode 311 may pass through the entire portion of the variable resistance material 320.

The upper plate 330 may provide an external pressure to the variable resistance material 320 in response to a motion of a user. In this instance, the upper plate 330 may include at least one projection 331. A force applied to the upper plate 330 in a horizontal direction may be converted into a pressure with respect to the variable resistance material 320, by the at least one projection 331 included in the upper plate 330.

A process of converting the force applied in the horizontal direction into the pressure with respect to the variable resistance material 320 will be described in detail with reference to FIG. 6.

Figure 4:
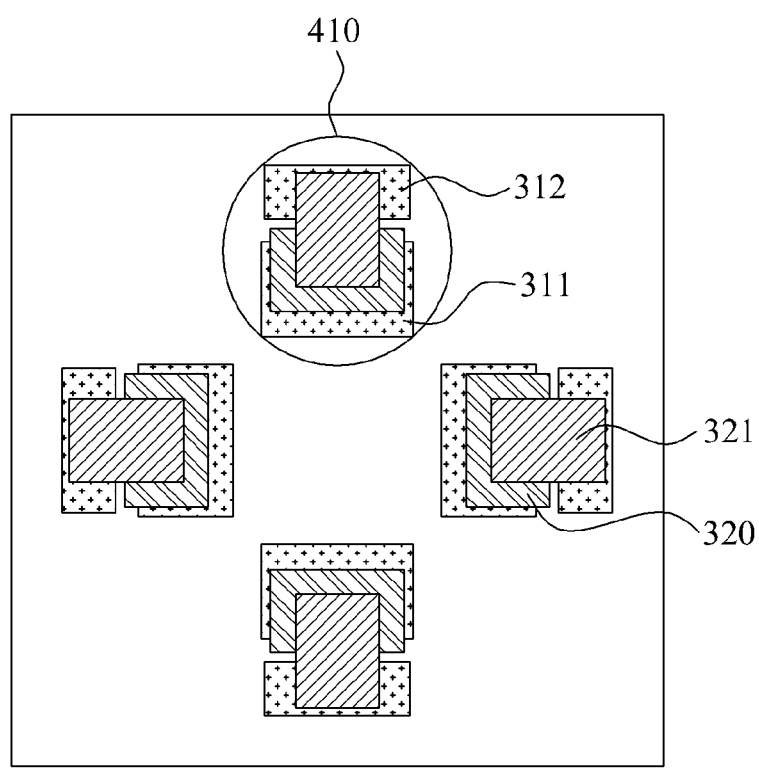
FIG. 4 is a top view illustrating a lower plate in a tactile sensation measuring apparatus according to embodiments.

FIG. 4 is a top view illustrating a lower plate in a tactile sensation measuring apparatus according to embodiments.

The lower plate 310 of the tactile sensation measuring apparatus 100 may include a plurality of pressure measuring units 410 using the variable resistance material 320. In this instance, each of the plurality of pressure measuring units 410 may include the variable resistance material 320, the electrode 311 that supplies electricity, the electrode 312 that outputs the electricity, and the electricity transfer unit 321.

As shown in FIG. 4, the plurality of pressure measuring units 410 may be disposed on the lower plate 310 of the tactile sensation measuring apparatus 100 in each direction. Accordingly, the lower plate 310 may measure a location of an external pressure provided by the upper plate 330 in response to a motion of a user. In this instance, the tactile sensation measuring apparatus 100 may measure a magnitude and a direction of a force corresponding to the motion of the user with respect to three axes, based on a position of each of the plurality of pressure measuring units 410, and the magnitude of the external pressure measured by each of the plurality of pressure measuring units 410.

As shown in FIG. 4, the variable resistance material 320 may be provided in a form surrounding the electric transfer unit 321 connected to the electrode 312 to maximize an area through which the electricity is output.

Figure 5:
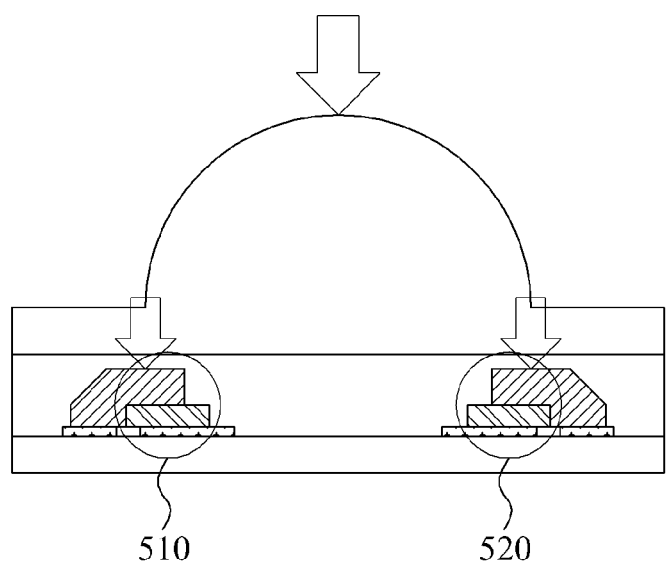
FIG. 5 is a cross-sectional view illustrating an operation of a tactile sensation measuring apparatus according to embodiments.

FIG. 5 is a cross-sectional view illustrating an operation of a tactile sensation measuring apparatus according to embodiments.

When an external pressure is applied to the upper plate 330 of the tactile sensation measuring apparatus 100 in response to a motion of a user, the variable resistance material 320 may be compressed by the external pressure applied, and a resistance of the variable resistance material 320 may change.

In this instance, as shown in FIG. 5, when the pressure is applied to the upper plate 330 in a vertical direction, an identical pressure may be applied to a first pressure measuring apparatus 510 and a second pressure measuring apparatus 520. Accordingly, a resistance of the variable resistance material 320 measured by the first pressure measuring apparatus 510 may be identical to a resistance of the variable resistance material 320 measured by the second pressure measuring apparatus 520.

In addition, when the first pressure measuring apparatus 510 and the second pressure measuring apparatus 520 measure an identical pressure, the tactile sensation measuring unit 130 may determine a direction in which an external pressure is applied to the upper plate 330 to be a vertical direction. Accordingly, the tactile sensation measuring unit 130 may measure a normal force corresponding to a magnitude of the pressure measured by the first pressure measuring apparatus 510 and the second pressure measuring apparatus 520 on the upper plate 330.

Figure 6:
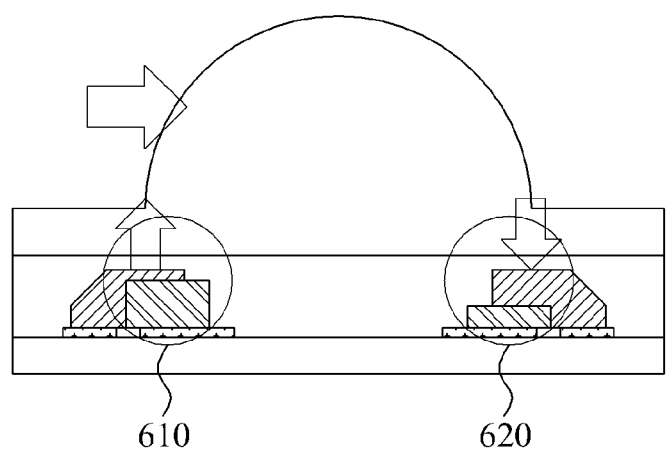
FIG. 6 is a cross-sectional view illustrating a process of a tactile sensation measuring apparatus measuring a pressure applied in a lateral direction according to embodiments.

FIG. 6 is a cross-sectional view illustrating a process of a tactile sensation measuring apparatus measuring a shear force according to embodiments.

FIG. 6 illustrates an operation of the tactile sensation measuring apparatus 100 when a shear force is applied to the upper plate 330 by a motion of the user. For example, when the user slides a hand in a horizontal direction while the hand of the user is in contact with the upper plate 330, a shear force corresponding to an external pressure applied in a horizontal direction may be applied to the upper plate 330. In this instance, the projection 331 of the upper plate 330 may incline in a direction opposite to the direction in which the external pressure is applied.

In this instance, a second pressure measuring apparatus 620 disposed on a side opposite to the direction in which the external pressure is applied may measure a pressure based on a gradient of the projection 331. In addition, a first pressure measuring apparatus 610 disposed on a side to which the external pressure is applied may determine that a pressure is reduced as the projection 331 inclines toward the second pressure measuring apparatus 620, as shown in FIG. 6.

Accordingly, the pressure measured by the first pressure measuring apparatus 610 may decrease, and the pressure measured by the second pressure measuring apparatus 620 may increase. That is, a resistance of a variable resistance material included in the first pressure measuring apparatus 610 may be different from a resistance of a variable resistance material included in the second pressure measuring apparatus 620.

In addition, when the pressure measured by the second pressure measuring apparatus 620 increases, and the pressure measured by the first pressure measuring apparatus 610 decreases, the tactile sensation measuring unit 130 may determine the direction in which the external pressure is applied to the upper plate 330 to be a direction from a position of the first pressure measuring apparatus 610 to a position of the second pressure measuring apparatus 620. Accordingly, the tactile sensation measuring unit 130 may measure the shear force applied in the direction from the position of the first pressure measuring apparatus 610 to the position of the second pressure measuring apparatus 620 on the upper plate 330.

Figure 7:
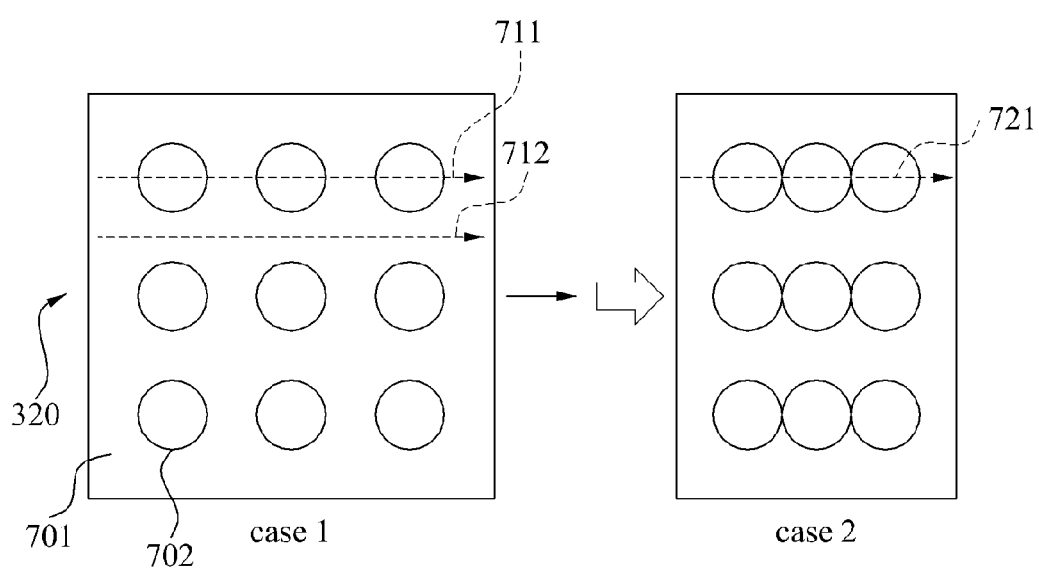
FIG. 7 is a view illustrating a structure of a variable resistance material according to embodiments.

FIG. 7 is a view illustrating a structure of a variable resistance material according to embodiments.

As shown in FIG. 7, the variable resistance material 320 may include a second conductor 702 in a first conductor 701. Here, the first conductor 701 may correspond to a conductor of which a volume is reduced by an external pressure applied, and the second conductor 702 may correspond to a conductor of which a volume is maintained irrespective of an external pressure applied. In this instance, a resistance of the first conductor 701 may be lower than a resistance of the second conductor 702.

When an external pressure is absent, the variable resistance material 320 may be in a state as shown in Case 1 of FIG. 7. When an external pressure is applied, the variable resistance material 320 may be in a state as shown in Case 2 of FIG. 7.

Referring to Case 1 of FIG. 7, electricity input into the variable resistance material 320 may pass through the first conductor 701 and the second conductor 702, as shown along a path 711. In this instance, a resistance of the variable resistance material 320 may be determined based on a distance through which the electricity passes in the first conductor 701, a resistance of the first conductor 701, a distance the electricity passes through the second conductor 702, and a resistance of the second conductor 702.

In addition, the electricity input into the variable resistance material 320 may pass through only the first conductor 701 via a gap between second conductors 702, as shown along a path 712. In this instance, the resistance of the variable resistance material 320 may be determined based on the distance through which the electricity passes in the first conductor 701, and the resistance of the first conductor 701.

Accordingly, the resistance of the variable resistance material 320 may be determined based on a resistance with respect to the electricity passing along the path 711, and a resistance with respect to the electricity passing along the path 712.

Referring to Case 2 of FIG. 7, the first conductor 701 of the variable resistance material 320 may be compressed, and the gap between second conductors 702 may narrow.

In this instance, a distance the electricity input into the variable resistance material 320 passes through the second conductor 702 may be longer than a distance through which the electricity passes in the first conductor 701, as shown along a path 721. Accordingly, the resistance of the variable resistance material 320 may be determined based on the distance through which the electricity passes in the second conductor 702, and a resistance of the second conductor 702. In addition, when a density of the variable resistance material 320 increases as the first conductor 701 is compressed, the resistance of the variable resistance material 320 may increase.

That is, when an external pressure is applied, a distance through which electricity passes in the second conductor 702 having a higher resistance may increase in the variable resistance material 320 and thus, the resistance of the variable resistance material 320 may increase.

Figure 8:
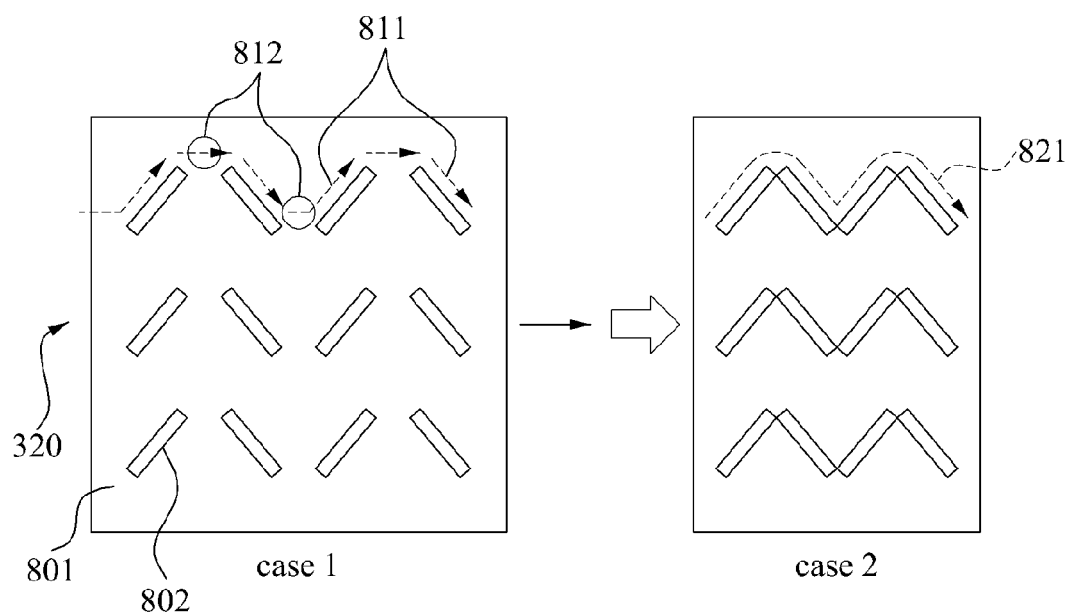
FIG. 8 is a view illustrating a structure of a variable resistance material according to other embodiments.

FIG. 8 is a view illustrating a structure of a variable resistance material according to other embodiments.

As shown in FIG. 8, the variable resistance material 320 may include a second conductor 802 in a first conductor 801. Here, the first conductor 801 may correspond to a conductor of which a volume is reduced by an external pressure applied, and the second conductor 802 may correspond to a conductor of which a volume is maintained irrespective of an external pressure applied. In this instance, a resistance of the second conductor 802 may be lower than a resistance of the first conductor 801.

When an external pressure is absent, the variable resistance material 320 may be in a state as shown in Case 1 of FIG. 8. When an external pressure is applied, the variable resistance material 320 may be in a state as shown in Case 2 of FIG. 8.

Referring to Case 1 of FIG. 8, electricity input into the variable resistance material 320 may pass through the first conductor 801 and the second conductor 802, as shown along a path 811. In this instance, a resistance of the variable resistance material 320 may be determined based on a distance the electricity passes through the first conductor 801, a resistance of the first conductor 801, a distance the electricity passes through the second conductor 802, and a resistance of the second conductor 802.

Referring to Case 2 of FIG. 8, the first conductor 801 of the variable resistance material 320 may be compressed, and a gap between second conductors 802 may narrow. When the first conductor 801 is compressed by the external pressure, and the second conductors 802 are in contact with each other, the electricity input into the variable resistance material 320 may pass through the second conductors 802, and may be output, as shown along a path 821. Accordingly, the resistance of the variable resistance material 320 may be determined based on a distance through which the electricity passes in the second conductors 802, and a resistance of the second conductor 802.

That is, when an external pressure is applied, a distance the electricity passes through the second conductor 802 having a lower resistance may increase in the variable resistance material 320 and thus, the resistance of the variable resistance material 320 may decrease.

Figure 9:
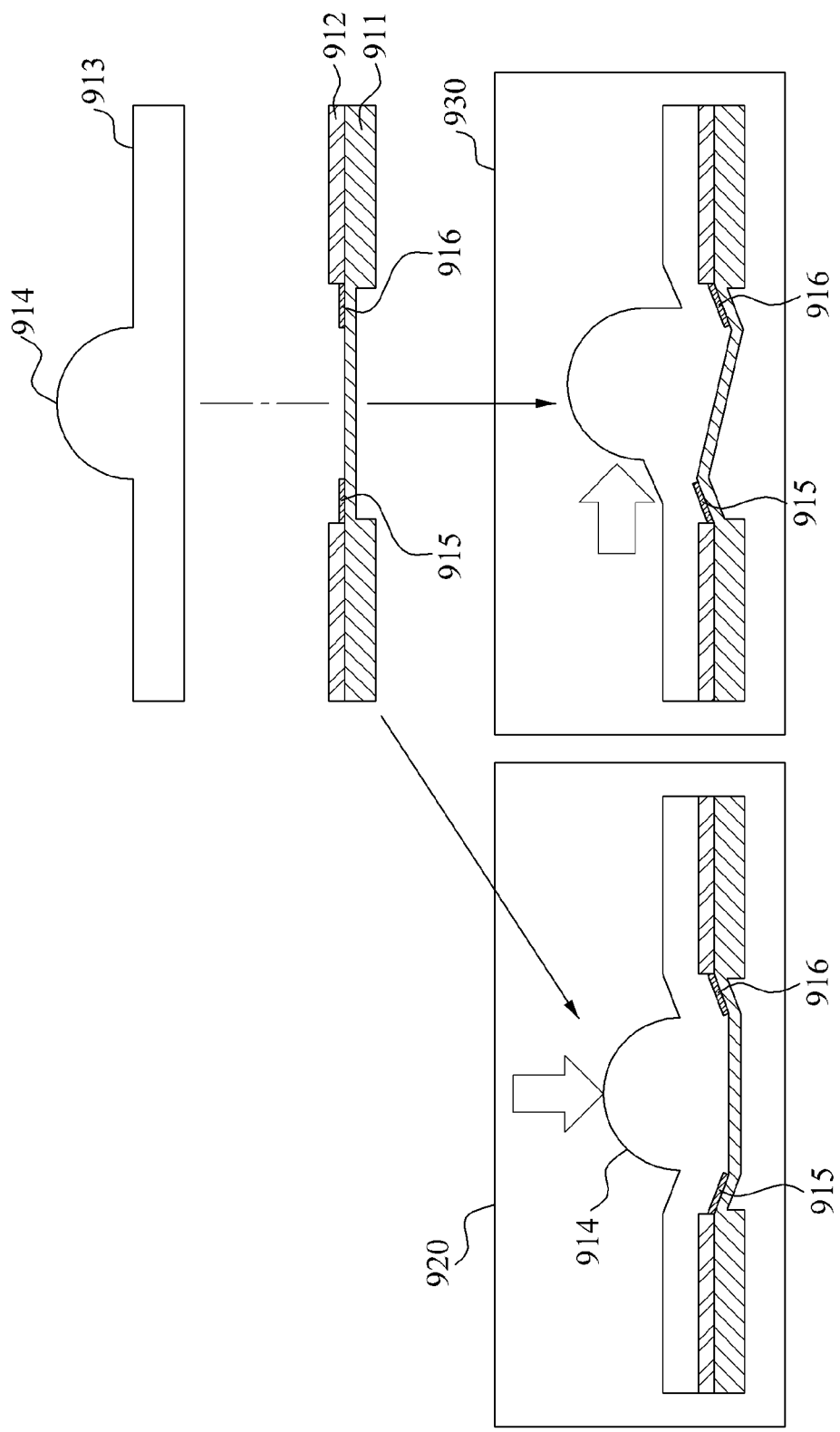
FIG. 9 is a cross-sectional view illustrating a tactile sensation measuring apparatus according to embodiments.

FIG. 9 is a cross-sectional view illustrating a tactile sensation measuring apparatus according to embodiments.

The tactile sensation measuring apparatus 100 may measure a magnitude of an external pressure applied, using a strain gauge of which a resistance changes as the strain gauge bends.

Referring to FIG. 9, the tactile sensation measuring apparatus 100 may include a first strain gauge 915, a second strain gauge 916, a lower plate 911 including metallic wires 912, and an upper plate 913 including a projection 914, for example, a bump.

When an external pressure is applied to the projection 914 formed on the upper plate 913 in a vertical direction in response to a motion of a user, the first strain gauge 915 and the second strain gauge 916 may bend toward a lower portion, as shown in a box 920 of FIG. 9.

In this instance, a direction and a magnitude of a resistance of the first strain gauge 915 and a direction and a magnitude of a resistance of the second stain gauge 916 may be changed identically.

When the magnitude and the direction of the resistance of the first strain gauge 915 and the magnitude and the direction of the resistance of the second stain gauge 916 are changed identically, the tactile sensation measuring unit 130 may determine a direction in which the external pressure is applied to the upper plate 913 to be a vertical direction. In addition, the tactile sensation measuring unit 130 may measure a normal force corresponding to a magnitude of the external pressure measured by the first strain gauge 915 and the second strain gauge 916 on the upper plate 913.

When an external pressure is applied to the projection 914 on the upper plate 913 in a horizontal direction in response to the motion of the user, the projection 914 may incline in a direction opposite to the direction in which the external pressure is applied. Accordingly, when the projection 914 inclines, the first strain gauge 915 disposed on a side to which the external pressure is applied may bend toward an upper portion, and the second strain gauge 916 disposed at a side opposite to the direction in which the external pressure is applied may bend toward a lower portion, as shown in a box 930 of FIG. 9.

In this instance, a resistance of the first strain gauge 915 and a resistance of the second strain gauge 916 may change conversely to each other.

When a change in the resistance of the first strain gauge 915 indicates a decrease in the external pressure, and a change in the resistance of the second strain gauge 916 indicates an increase in the external pressure, the tactile sensation measuring unit 130 may determine that the pressure is applied to the upper plate 913 in a horizontal direction from the first strain gauge 915 to the second strain gauge 916.

Accordingly, the tactile sensation measuring unit 130 may measure a shear force applied to the upper plate 913 in a horizontal direction from the first stain gauge 915 to the second strain gauge 916.

In addition, the tactile sensation measuring unit 130 may measure a pressure, applied to the upper plate 913, corresponding to a magnitude of the external pressure measured by the first strain gauge 915 and the second strain gauge 916.

Figure 10:
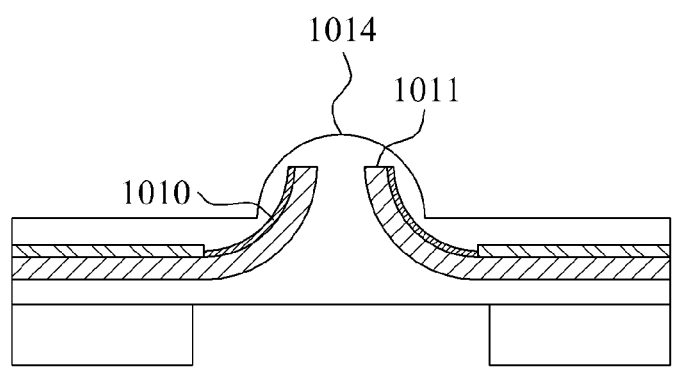
FIG. 10 is a cross-sectional view illustrating a tactile sensation measuring apparatus according to other embodiments.

FIG. 10 is a cross-sectional view illustrating a tactile sensation measuring apparatus according to other embodiments.

In the tactile sensation measuring apparatus 100, a strain gauge of which a resistance changes when the strain gauge bends may be inserted in an upper plate.

In particular, as shown in FIG. 10, a first strain gauge 1010, and a second strain gauge 1011 may be inserted in an internal portion of a projection 1014 formed on the upper plate. In this instance, since the first strain gauge 1010 and the second strain gauge 1011 may bend in response to a small change in the projection 1014, a sensitivity of the tactile sensation measuring apparatus 100 may increase.

Figure 11:
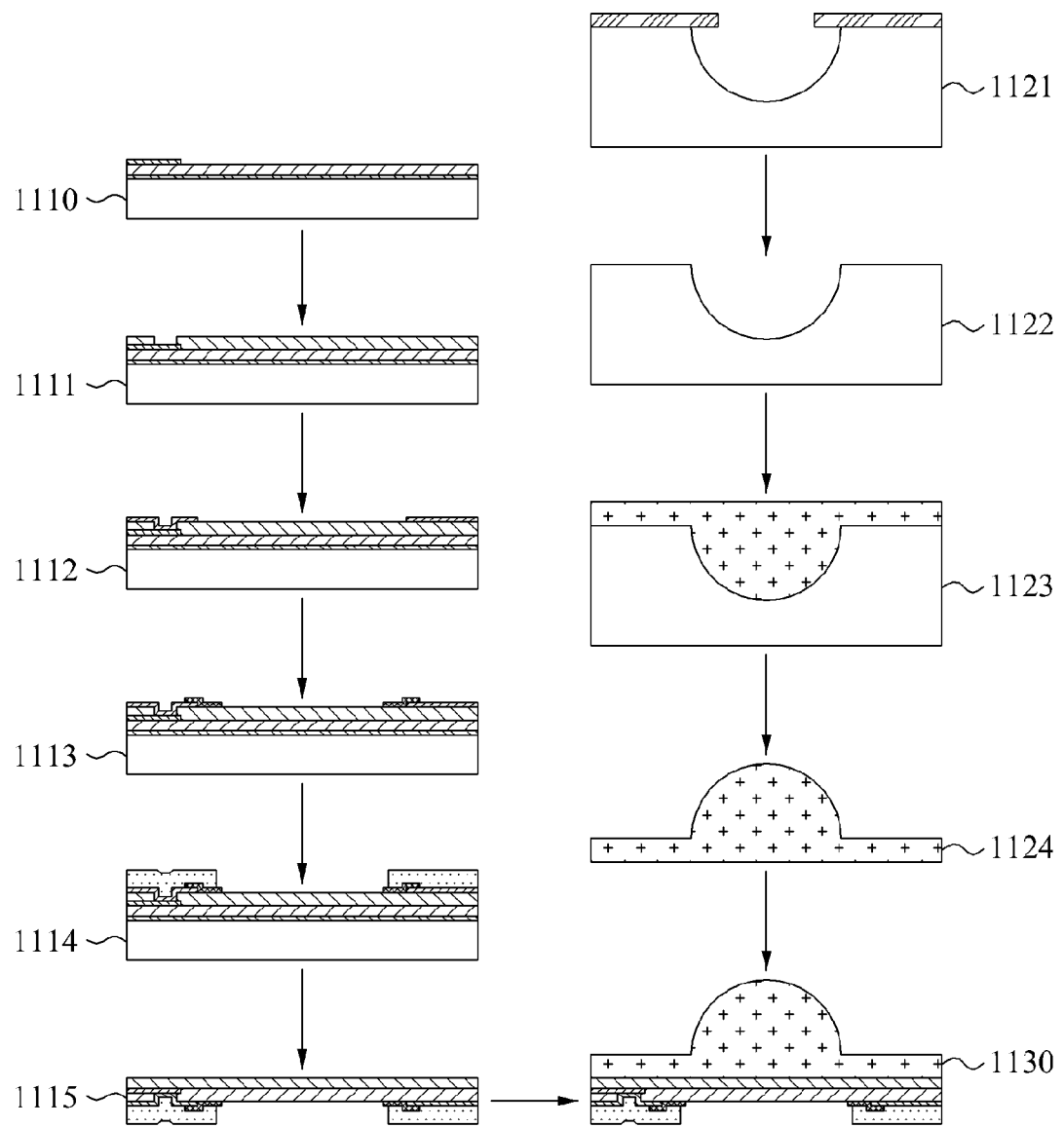
FIG. 11 is a view illustrating a method of manufacturing a tactile sensation measuring apparatus according to embodiments.

FIG. 11 is a view illustrating a method of manufacturing a tactile sensation measuring apparatus according to embodiments.

The method of FIG. 11 may include an operation of generating the lower plate 911, an operation of generating the upper plate 913, and an operation of connecting the lower plate 911 to the upper plate 913. In this instance, the operation of generating the lower plate 911 and the operation of generating the upper plate 913 may be performed independently from each other.

The operation of generating the lower plate 911 may include operations 1110 through 1115.

In operation 1110, an apparatus for manufacturing the tactile sensation measuring apparatus, hereinafter referred to as the manufacturing apparatus, may generate the lower plate 911 by coating an oxidized silicon substrate with polyimide.

In operation 1111, the manufacturing apparatus may pattern the polyimide on the lower plate 911 generated in operation 1110.

In operation 1112, the manufacturing apparatus may form the metallic wire 912 by patterning gold on the lower plate 911 on which polyimide is patterned in operation 1111.

In operation 1113, the manufacturing apparatus may form a strain gauge by patterning a distributed CNT or a metal corresponding to a sensing material on the metallic wire 912 formed in operation 1112.

In operation 1114, the manufacturing apparatus may generate a trench of a SU-8 material by performing lithography in order to increase a sensitivity of the strain gauge formed in operation 1113.

In operation 1115, the manufacturing apparatus may separate a polyimide substrate from the lower plate 911 by removing a silicon oxide film from the lower plate 911 on which the trench of the SU-8 material is generated in operation 1114.

The operation of generating the upper plate 913 may include operations 1121 through 1124.

In operation 1121, the manufacturing apparatus may perform isotropic etching of silicon on a substrate.

In operation 1122, the manufacturing apparatus may etch nitride on the substrate on which the isotropic etching is performed in operation 1121.

In operation 1123, the manufacturing apparatus may insert PDMS into the substrate etched in operation 1122, and may harden the PDMS.

In operation 1124, the manufacturing apparatus may generate the upper plate 913 by separating the polymer previously hardened in operation 1123, from the substrate.

The operation of connecting the lower plate 911 to the upper plate 913 may be performed in operation 1130.

In operation 1130, the manufacturing apparatus may generate the tactile sensation measuring apparatus by connecting the upper plate 913 generated in operation 1124 with the lower plate 911 generated in operation 1115, in line.

Figure 12:
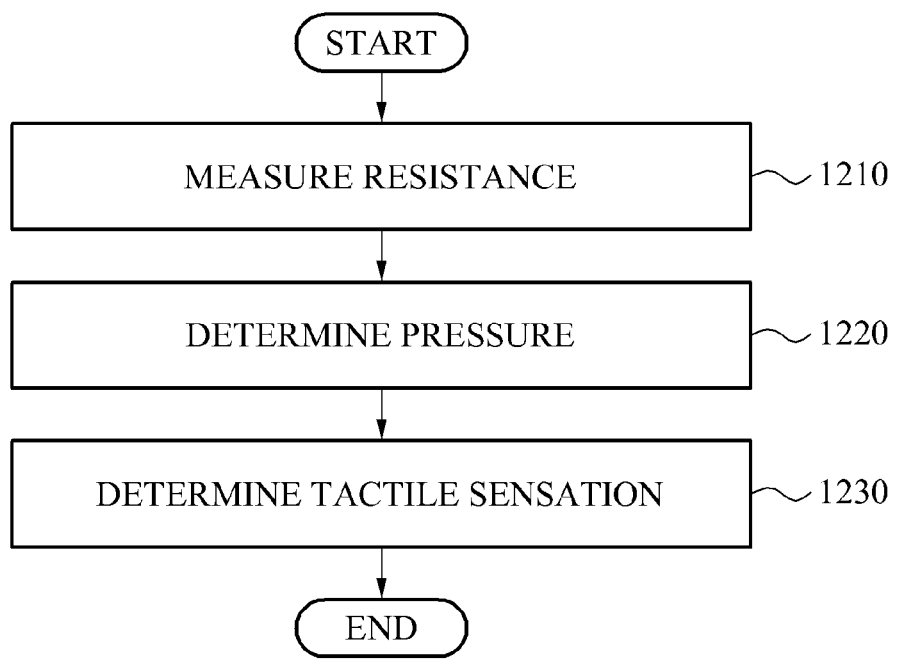
FIG. 12 is a flowchart illustrating a method of measuring a tactile sensation according to embodiments.

FIG. 12 is a flowchart illustrating a method of measuring a tactile sensation according to embodiments.

Referring to FIG. 12, in operation 1210, the resistance measuring unit 220 of the pressure measuring unit 120 may measure a resistance of the variable resistance material 210. In this instance, the resistance measuring unit 220 may input electricity into one side of the variable resistance material 210, and may measure a voltage or a current of the electricity passing through the variable resistance material 210 at another side of the variable resistance material 210, thereby measuring the resistance of the variable resistance material 210.

In operation 1220, the pressure determining unit 230 of the pressure measuring unit 120 may determine a magnitude of an external pressure applied to the variable resistance material 210, based on the resistance measured in operation 1210. In this instance, the pressure determining unit 230 may determine a magnitude of the external pressure corresponding to the resistance, depending on properties of the variable resistance material 210.

For example, when the resistance of the variable resistance material 210 changes in proportion to the external pressure, the pressure determining unit 230 may determine the magnitude of the external pressure applied to the variable resistance material 210 to be proportional to the resistance measured by the resistance measuring unit 220. In addition, when the resistance of the variable resistance material 210 changes in inverse proportion to the external pressure, the pressure determining unit 230 may determine the magnitude of the external pressure applied to the variable resistance material 210 to be inversely proportional to the resistance measured by the resistance measuring unit 220.

In operation 1230, the tactile sensation measuring unit 130 may measure a 3D tactile sensation corresponding to the external pressure, based on a position of each of a plurality of pressure measuring units 120 having measured the external pressure in operation 1220, and the magnitude of the external pressure measured by each of the plurality of pressure measuring units 120.

For example, when the plurality of pressure measuring units 120 measures an identical pressure, the tactile sensation measuring unit 130 may measure an external pressure applied by the user in a direction vertical to the pressure providing unit 110. In addition, when a portion of the plurality of pressure measuring units 120 measures a higher pressure when compared to another portion of the plurality of pressure measuring units 120, the tactile sensation measuring unit 130 may measure an external pressure applied by the user to a location adjacent to the portion of the plurality of pressure measuring units 120, or an external pressure applied by the user in a direction of the portion of the plurality of pressure measuring units 120.

Figure 13:
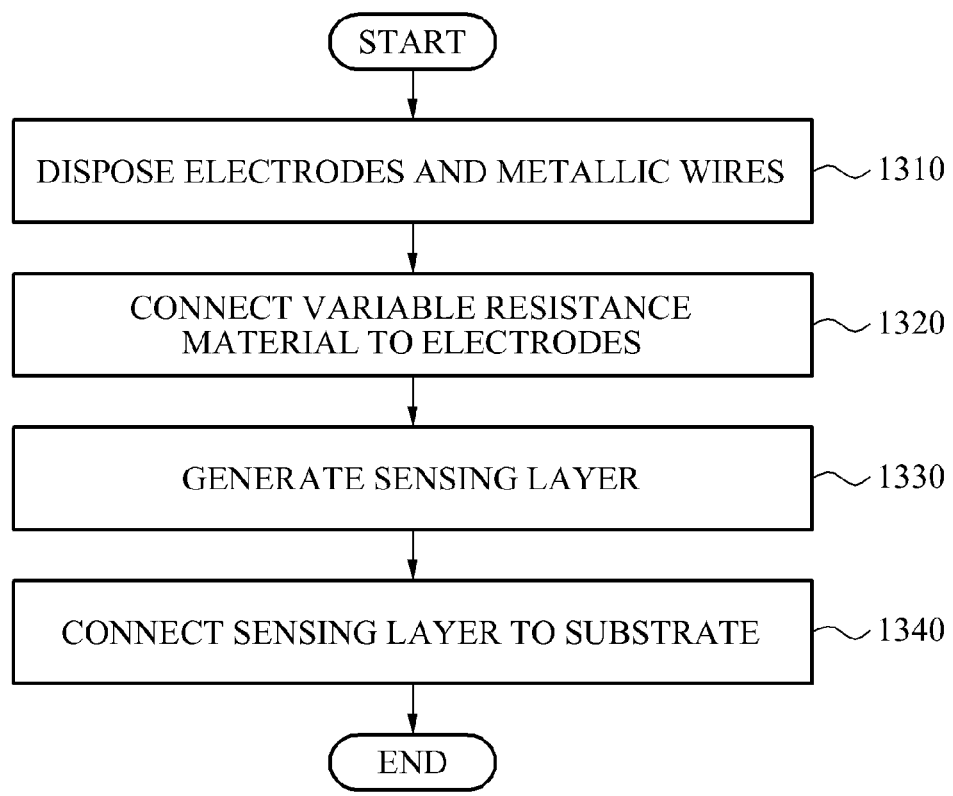
FIG. 13 is a flowchart illustrating a method of manufacturing a tactile sensation measuring apparatus according to embodiments.

FIG. 13 is a flowchart illustrating a method of manufacturing a tactile sensation measuring apparatus according to embodiments.

Referring to FIG. 13, in operation 1310, the manufacturing apparatus may dispose a plurality of electrodes and a metallic wire on a substrate.

In operation 1320, the manufacturing apparatus may connect, to the plurality of electrodes disposed in operation 1310, a variable resistance material of which a resistance changes when an external pressure is applied.

In this instance, the manufacturing apparatus may connect the resistance variable material to an electrode disposed to be vertical to the substrate, and an electrode disposed to be horizontal to the substrate.

In addition, the variable resistance material may correspond to a material generated using at least one of a carbon nanotube, graphene, and a graphene flower.

In operation 1330, the manufacturing apparatus may generate a sensing layer to provide a pressure to the variable resistance material in response to a motion of a user.

In this instance, the manufacturing apparatus may form the sensing layer by disposing a liquid polymer in a silicon mold that determines a shape of the polymer.

In operation 1340, the manufacturing apparatus may generate the tactile sensation measuring apparatus 100 by connecting the sensing layer generated in operation 1330 to the substrate to which the variable resistance material is connected in operation 1320.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for measuring a pressure, the apparatus comprising:
   a resistance measuring unit configured to measure a resistance of a variable resistance material of which a resistance changes when an external pressure is applied; and a pressure determining unit configured to determine a magnitude of the external pressure applied to the variable resistance material to be proportional to the measured resistance, wherein the variable resistance material comprises a first conductor and a second conductor, and the second conductor has a resistance higher than a resistance of the first conductor, wherein when the external pressure is applied, a change in a volume of the first conductor is different from a change in a volume of the second conductor.

2. An apparatus for measuring a tactile sensation, the apparatus comprising:

a plurality of pressure measuring units, each pressure measuring unit configured to measure a magnitude of an external pressure that is proportional to a measured resistance of a variable resistance material of which a resistance changes when an external pressure is applied; and a tactile sensation measuring unit configured to measure a three-dimensional (3D) tactile sensation corresponding to the external pressure, based on a position of each of the plurality of pressure measuring units, and the magnitude of the external pressure measured by each of the plurality of pressure measuring units, wherein the variable resistance material comprises a first conductor and a second conductor, and the second conductor has a resistance higher than a resistance of the first conductor, wherein when the external pressure is applied, a change in a volume of the first conductor is different from a change in a volume of the second conductor.

3. The apparatus of claim 2, further comprising:

a pressure providing unit configured to provide a pressure to at least one of the plurality of pressure measuring units, in a direction in which the pressure is applied based on a motion of a user.

4. The apparatus of claim 3, wherein the pressure providing unit comprises a polymer and a projection on a surface in contact with the user.

5. The apparatus of claim 3, wherein the plurality of pressure measuring units is disposed in a form of an array in a lower portion of the pressing providing unit.

6. A method of measuring a pressure, the method comprising:

measuring a resistance of a variable resistance material of which a resistance changes when an external pressure is applied; and determining a magnitude of the external pressure applied to the variable resistance material to be proportional to the measured resistance, wherein the variable resistance material comprises a first conductor and a second conductor, and the second conductor has a resistance higher than a resistance of the first conductor, wherein when the external pressure is applied, a change in a volume of the first conductor is different from a change in a volume of the second conductor.

7. At least one non-transitory computer-readable medium storing computer readable instructions that control at least one processor to perform the method of claim 6.

8. A method of measuring a tactile sensation, the method comprising:

measuring, by each of a plurality of pressure measuring units, a magnitude of an external pressure that is proportional to a measured resistance of a variable resistance material of which a resistance changes when an external pressure is applied; and measuring a three-dimensional (3D) tactile sensation corresponding to the external pressure, based on a position of each of the plurality of pressure measuring units, and the magnitude of the external pressure measured by each of the plurality of pressure measuring units, wherein the variable resistance material comprises a first conductor and a second conductor, and the second conductor has a resistance higher than a resistance of the first conductor, wherein, when the external pressure is applied, a change in a volume of the first conductor is different from a change in a volume of the second conductor.

9. The method of claim 8, further comprising:

providing a pressure to at least one of the plurality of pressure measuring units in a direction in which the pressure is applied based on a motion of a user.

10. At least one non-transitory computer-readable medium storing computer readable instructions that control at least one processor to perform the method of claim 8.

11. A method of manufacturing a tactile sensation measuring apparatus, the method comprising:

disposing a plurality of electrodes, and a plurality of wires on a substrate;

connecting, to the plurality of electrodes, a variable resistance material of which a resistance changes in proportion to an applied external pressure;

generating a sensing layer to provide a pressure to the variable resistance material in response to a motion of a user; and connecting the sensing layer to the substrate, wherein the variable resistance material comprises a first conductor and a second conductor, and the second conductor has a resistance higher than a resistance of the first conductor, wherein, when the external pressure is applied, a change in a volume of the first conductor is different from a change in a volume of the second conductor.

12. The method of claim 11, wherein the connecting of the variable resistance material comprises connecting the variable resistance material to one of the electrodes disposed to be vertical to the substrate, and one of the electrodes disposed to be horizontal to the substrate.

13. The method of claim 11, wherein the variable resistance material corresponds to a material generated using at least one of a carbon nanotube (CN), graphene, and a graphene flower.

14. The method of claim 11, wherein the generating comprises forming the sensing layer using a liquid polymer.

* * * * *